United States Patent
Engebretsen et al.

(10) Patent No.: US 12,092,027 B1
(45) Date of Patent: Sep. 17, 2024

(54) MANIFOLD ASSEMBLY AND ANTI-ICE SYSTEM FOR GAS TURBINE ENGINE

(71) Applicant: Rolls-Royce North American Technologies Inc., Indianapolis, IN (US)

(72) Inventors: Eric Engebretsen, Indianapolis, IN (US); Aaron Weishaar, Indianapolis, IN (US); Jonathan Acker, Indianapolis, IN (US); Brett Hartnagel, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/347,705

(22) Filed: Jul. 6, 2023

(51) Int. Cl.
*F02C 6/08* (2006.01)
*F02C 7/047* (2006.01)

(52) U.S. Cl.
CPC .............. *F02C 7/047* (2013.01); *F02C 6/08* (2013.01)

(58) Field of Classification Search
CPC . F02C 7/047; F02C 6/08; F01D 25/02; B64D 2033/0233
See application file for complete search history.

(56) References Cited

U.S. PATENT DOCUMENTS

| | | | | |
|---|---|---|---|---|
| 2,746,671 A * | 5/1956 | Newcomb | ............... | F02C 7/047 415/121.2 |
| 3,981,466 A * | 9/1976 | Shah | .............. | F02C 7/047 60/39.093 |
| 5,029,440 A * | 7/1991 | Graber | ............... | F02C 7/047 244/134 B |
| 6,442,944 B1 * | 9/2002 | Skur, III | ............... | F01D 25/02 60/39.093 |
| 10,677,164 B2 * | 6/2020 | Moniz | ............... | F02C 3/30 |
| 11,698,024 B1 * | 7/2023 | Menheere | ............... | F02C 7/047 415/1 |
| 2006/0005546 A1 * | 1/2006 | Orlando | ............... | F01D 9/065 60/782 |
| 2010/0119356 A1 * | 5/2010 | Fintescu | ............... | F16K 15/038 415/47 |
| 2010/0296910 A1 * | 11/2010 | Wolford | ............... | F02C 7/045 415/178 |
| 2012/0240594 A1 | 9/2012 | Shamara | | |
| 2014/0212278 A1 | 7/2014 | Cowgill | | |
| 2015/0033698 A1 | 2/2015 | Cuevas et al. | | |
| 2016/0061056 A1 | 3/2016 | Appukuttan et al. | | |
| 2017/0167273 A1 * | 6/2017 | Maguire | ............... | F01D 11/24 |
| 2020/0039654 A1 * | 2/2020 | Smith | ............... | B64D 15/04 |
| 2021/0115854 A1 * | 4/2021 | Pikovsky | ............... | F02C 7/143 |
| 2023/0053554 A1 * | 2/2023 | Sibbach | ............... | F02K 3/06 |

* cited by examiner

Primary Examiner — William H Rodriguez
(74) Attorney, Agent, or Firm — Barnes & Thornburg LLP

(57) ABSTRACT

A gas turbine engine includes: a manifold arrangement; a plurality of inlet guide vanes located radially inward of the manifold arrangement, wherein each inlet guide vane of the plurality of guide vanes includes an anti-ice cavity for directing a flow of an anti-ice air; and a plurality of crossover ducts located radially inside the manifold arrangement, wherein each crossover duct of the plurality of crossover ducts provides fluid communication between two adjacent inlet guide vanes.

17 Claims, 8 Drawing Sheets

MANIFOLD ASSEMBLY AND ANTI-ICE SYSTEM FOR GAS TURBINE ENGINE

TECHNICAL FIELD

This disclosure relates to a gas turbine engine, and particularly for an anti-ice system for a gas turbine engine with inlet guide vanes that are resistant to ice buildup.

BACKGROUND

Gas turbine engines are used on vehicles such as airplanes and helicopters. These engines are internal combustion engines that operate to produce thrust by discharging a high velocity exhaust. Some gas turbine engines can also include fan blades to create thrust.

Gas turbine engines include one or more compressors, a combustor and one or more turbines. Air is compressed in the compressor(s), mixed with fuel in the combustor and ignited, such that exhaust gases are created and discharged through a turbine to create thrust. The exhaust gas rotates the turbine, which is typically used to turn a shaft and produce shaft work output, such as to drive the compressor or a gearbox. There can be one or more turbines and corresponding shafts producing shaft work output. Systems within a gas turbine engine can use the shaft work output.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Compressors of a gas turbine engine include several airfoil types. An airfoil refers to a stationary or moving blade-like component that is used to control the flow of fluid or gas within the compressor, and they play a crucial role in directing the fluid or gas flow. There are two primary types of airfoils used in compressors: vanes, which remain stationary, and rotor blades, which spin.

Inlet guide vanes (IGVs) are typically located at the compressor inlet and are used to control the flow of fluid or gas as it enters the compressor. They may have an adjustable angle such that the inlet flow can be regulated, which helps in achieving optimal compressor performance.

In some operational conditions (e.g., certain atmospheric moisture and temperature conditions of engine intake air), non-heated inlet guide vanes may experience ice buildup. The accumulation of ice is problematic, as can cause compressor performance and/or operability loss or may be shed in large pieces that cause damage to downstream blades or vanes or other compressor hardware. To address this issue, inlet guide vanes may be heated. For example, the inlet guide vanes may be hollow and/or have fluid pathways for receiving hot air, where the associated heat prevents ice formation.

In modern inlet guide vanes, this hot air (or anti-ice air) is routed from a compressor's inter-stage or discharge bleed. The inlet guide vanes typically then release the air into the compressor flowpath/core flow (via one or more outlet openings, often via many holes in the IGV surface). While this arrangement is currently used and successful for preventing ice, it has certain drawbacks. For example, adding hot air to the compressor's flowpath may cause temperature distortion which leads to loss of stability margin. It may also increase certain turbine temperatures which reduces turbine life. Overall engine performance may also suffer. The embodiments discussed in this description provide improved structures and methods that address these drawbacks.

Figure 1:
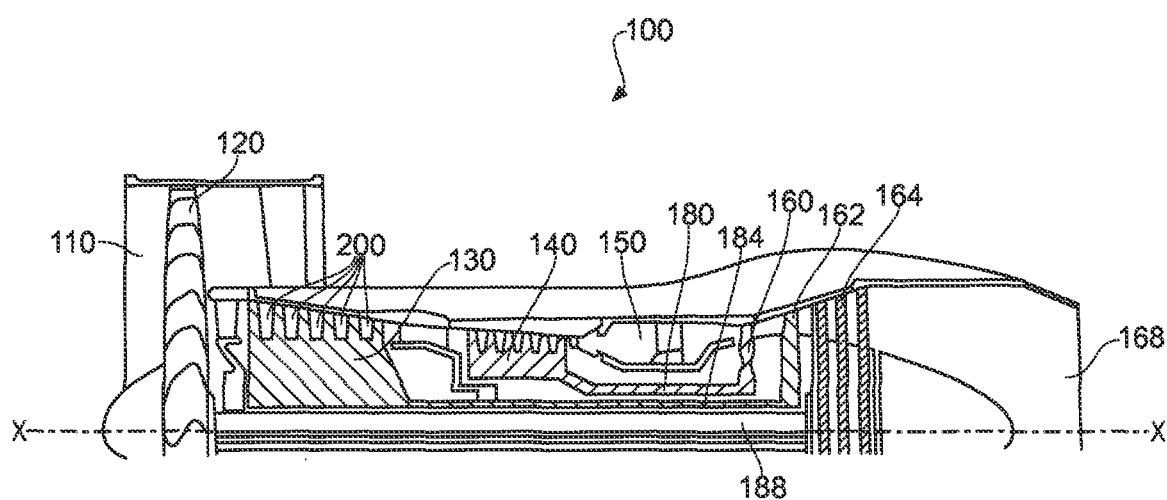
FIG. 1 is a partial section view of a gas turbine engine, particularly for use in aircraft applications.

FIG. 1 shows a schematic arrangement of a gas turbine engine for a typical aerospace application. The gas turbine engine 100 comprises in flow series an intake 110, a fan 120, an intermediate pressure compressor 130, a high pressure compressor 140, a combustion chamber 150, a high pressure turbine 160, an intermediate pressure turbine 162, a low pressure turbine 164 and an exhaust 168. The high pressure turbine 160 is arranged to drive the high pressure compressor 140 via a first shaft 180. The intermediate pressure turbine 162 is arranged to drive the intermediate pressure compressor 130 via a second shaft 184 and the low pressure turbine 164 is arranged to drive the fan 120 via a third shaft 188. In operation air flows into the intake 110 and is compressed by the fan 120. A first portion of the air flows through, and is compressed by, the intermediate pressure compressor 130 and the high pressure compressor 140 and is supplied to the combustion chamber 150. Fuel is injected into the combustion chamber 150 and is burned in the air to produce hot exhaust gases which flow through, and drive, the high pressure turbine 160, the intermediate pressure turbine 162 and the low pressure turbine 164. The hot exhaust gases leave the low pressure turbine 164 and flow through the exhaust 168 to provide propulsive thrust. A second portion of the air bypasses the main engine to provide propulsive thrust.

Typically, the intermediate pressure compressor 130 will include multiple stages of airflow control in the form of variable inlet guide vanes 200 for the first stage together with variable stator vanes 200 for the succeeding stages. Other configurations of the intermediate pressure compressor 130 may include a single stage of inlet guide vanes 200 without the succeeding stages of variable stator vanes 200. In this way, as the compressor speed is reduced from its design value these static vanes 200 are progressively closed in order to maintain an acceptable air angle value onto the following rotor blades.

Figure 2:
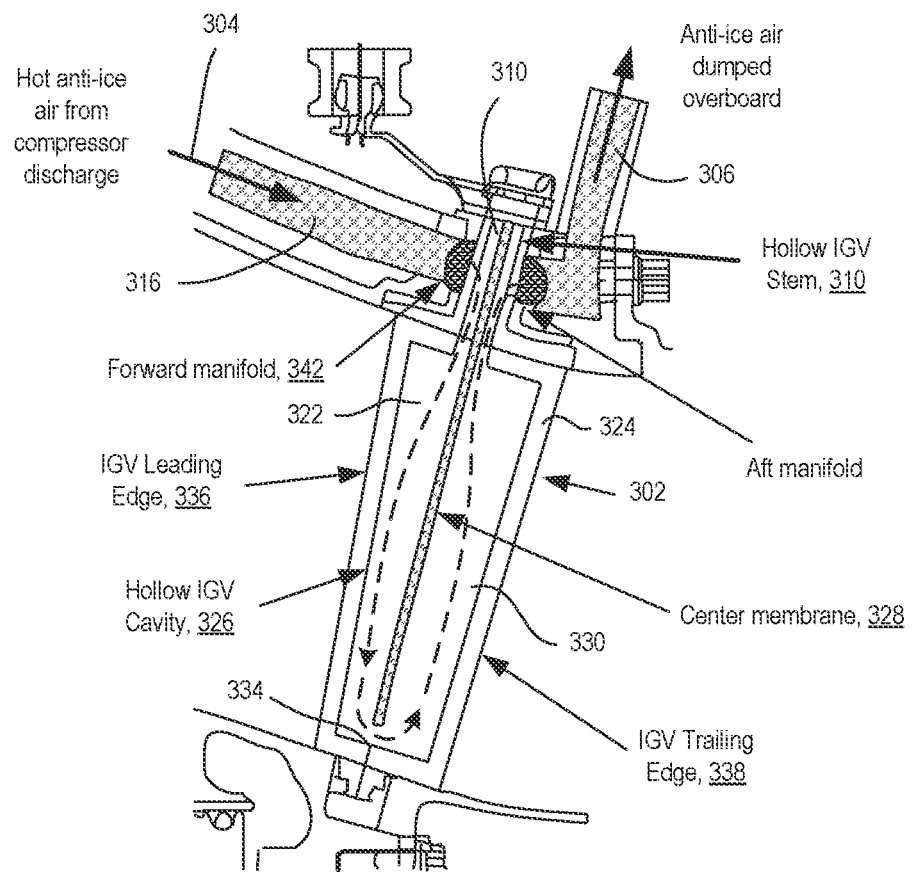
FIG. 2 is a side section view of a portion of an anti-ice system including a guide vane in accordance with certain aspects of the present disclosure.
Figure 3:
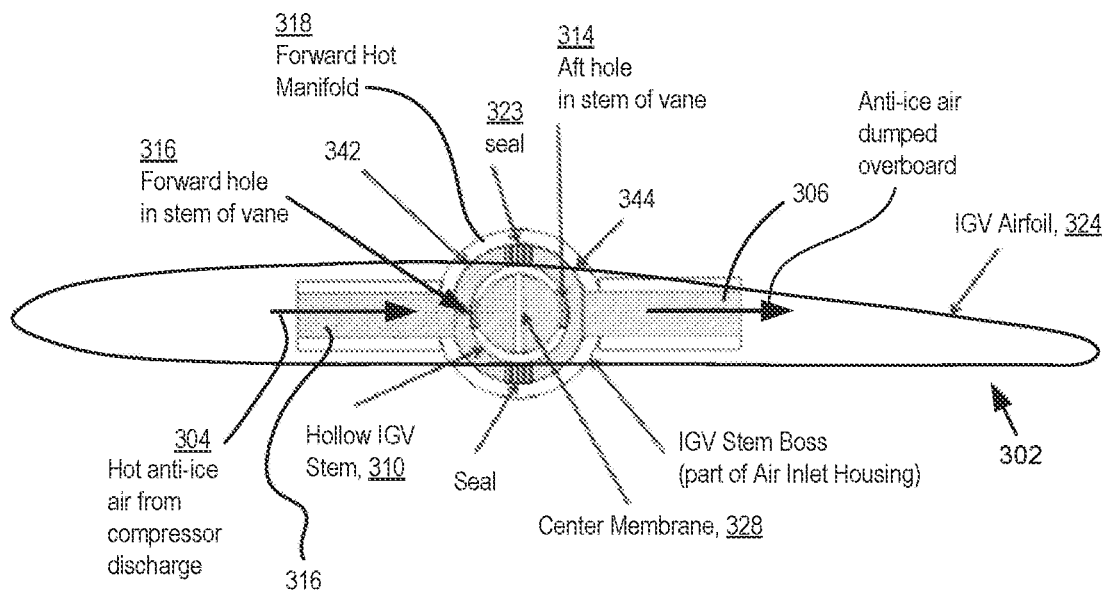
FIG. 3 is a top section view of a portion of the anti-ice system including a guide vane of FIG. 2.
Figure 4:
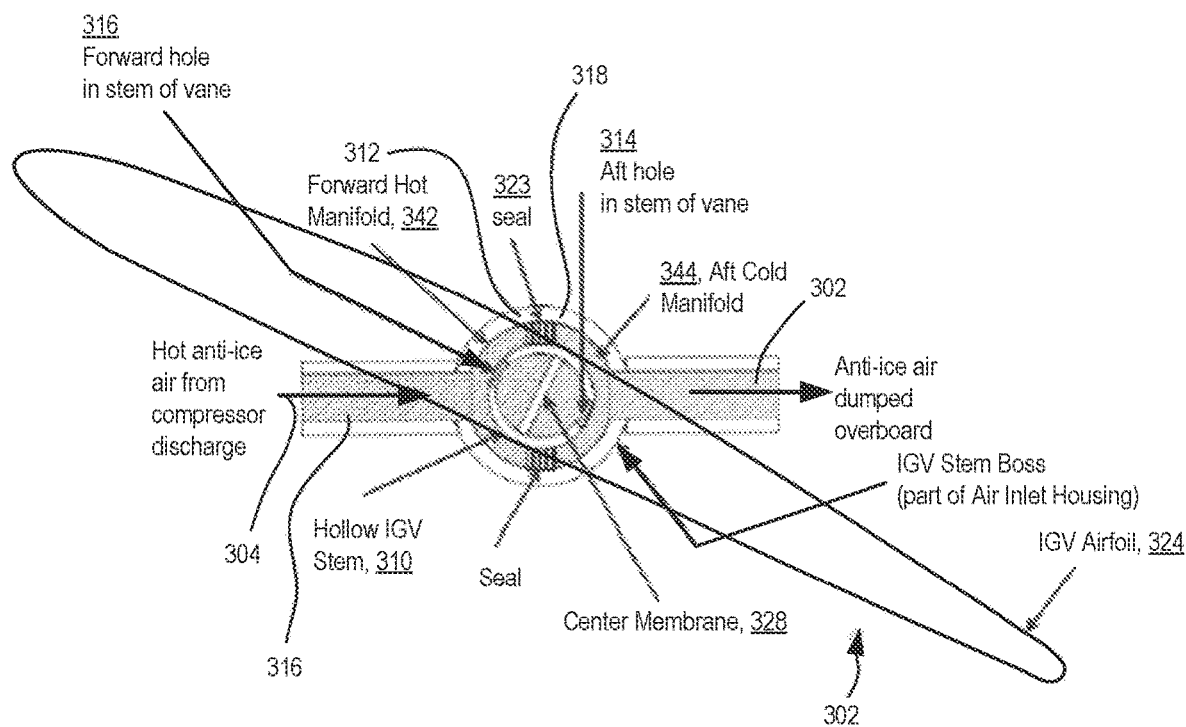
FIG. 4 is a section view of a portion of the anti-ice system including a guide vane of FIG. 2, where the guide vane is rotated relative to the orientation in FIG. 3.

FIGS. 2-4 show an example of a compressor 300 having an anti-ice system. An inlet guide vane 302 of the compressor 300 is arranged to receive hot air, or anti-ice air 304. The inlet guide vane 302 may receive hot air (e.g., routed from a location downstream within the compressor's flowpath and/or downstream of the compressor's discharge) to prevent ice buildup. Once circulated through the inlet guide vane 302 (as discussed in more detail below), the anti-ice air 304 may flow through an outlet channel 306 where it is ultimately dumped overboard via an outlet port 308. Advantageously, dumping the air overboard from the engine rather than back into the engine flowpath prevents the hot air from affecting compressor performance, prevents or substantially reduces temperature distortion, and may generally increase the engine's life via overall reduced temperatures.

As shown in FIGS. 2-4, the anti-ice air 304 is circulated through a flowpath within the inlet guide vane 302, where the inlet guide vane 302 has a stem 310 that includes an IGV inlet 312 and an IGV outlet 314. The anti-ice air reaches the IGV inlet 312 via an inlet channel 316, which may be formed integrally within other components and/or plumbed via tubing. The inlet channel 316 may receive hot air routed from a location downstream within the compressor's flowpath and/or downstream of the compressor's discharge.

The IGV inlet 312 may communicate with the inlet channel 316 at a stem manifold 318 located at a terminus of the inlet channel 316. The stem manifold 318 may be a generally cylindrical cavity and may receive a stem 310 of the inlet guide vane 302. The stem manifold 318 may have a manifold inlet (i.e., at a junction with the inlet channel 316) and also a manifold outlet (i.e., at a junction with the outlet channel 306). In the depicted embodiment, the manifold 318 has an inner diameter that is larger than an outer diameter of the stem 310, which allows the stem 310 to rotate within the manifold 318 while maintaining fluid communication with the inlet channel 316 and the outlet channel 306 (e.g., to accommodate adjustability of the inlet guide vane 302). To partition the manifold 318 between an inlet portion and an outlet portion (and also ensure the anti-ice air cannot bypass the inlet guide vane 302 by direct flow through the manifold), one or more seals 323 may be included, where the seals 323 generally contact the inner diameter of the manifold 318 and the outer diameter of the stem 310.

The stem 310 of the inlet guide vane 302 may be fixed to, and extend from, a main body 324 (or "airfoil") of the inlet guide vane 302. In the depicted embodiment, the stem 310 extends radially outward from the main body 324. As mentioned above, the stem 310 may extend into the manifold 318, and it may function to receive the anti-ice air 304 from the inlet channel 316 (via the IGV inlet 312 of the stem 310) and then discharge the anti-ice air 304 to the outlet channel 306 (via the IGV outlet 314 of the stem 310). The stem 310 may also function to secure the inlet guide vane 302 in place.

The stem 310, which may be hollow, may allow airflow to a corresponding hollow portion of the main body 324 of the inlet guide vane 302. Collectively, the hollow portion(s) of the inlet guide vane 302 that receive airflow are referred to as the anti-ice cavity 326.

The anti-ice cavity 326 may include a directed airflow path such that the anti-ice air 304 is directed along a particular route from the IGV inlet 312 to the IGV outlet 314. As shown, a center barrier 328 may generally distinguish the anti-ice cavity 326 between an inlet side 322 and an outlet side 330. The center barrier 328 may extend through the stem 310 and a portion of the main body 324, and it may terminate within the main body 324 (and/or have an opening within the main body 324) to allow airflow between the two sides. E.g, as shown in FIG. 2, a transition opening 334 is located at the radial-inner portion of the inlet guide vane 302 to allow the anti-ice air to flow from the inlet side 322 to the outlet side 330. This ensures that the entirety or majority of the inlet guide vane's airfoil is heated via the anti-ice air 304 flowing therein.

In the depicted embodiment, the inlet side 322 is located adjacent to a leading edge 336 and the outlet side 330 is located adjacent to a trailing edge 338. This may be desirable where a significant temperature loss is experienced by the anti-ice air as it flows through the inlet guide vane 302. However, this is not a required feature, and the opposite orientation may also be used.

FIGS. 3-4 depict a feature provided by the stem 310 and the manifold 318 that accounts for adjustability of the inlet guide vane 302. As shown in FIG. 3 (where the main body 324 is in a first position), the IGV inlet 312 is within the inlet portion 342 of the manifold 318 and similarly the IGV outlet 314 is within the outlet portion 344 of the manifold 318. In FIG. 3, the stem 310 has rotated relative to its position in FIG. 3 (to allow for adjustability of the main body 324). However, due to the shape and size of the manifold 318 (e.g., cylindrical surrounding the stem, and larger than the O.D. of the stem) and the position of the seals 323, the IGV inlet 312 remains within the inlet portion 342 of the manifold 318 and the IGV outlet 314 remains within the outlet portion 344 of the manifold 318. Up to 180 degrees of rotation of the stem 310 can be handled in this arrangement.

Figure 5:
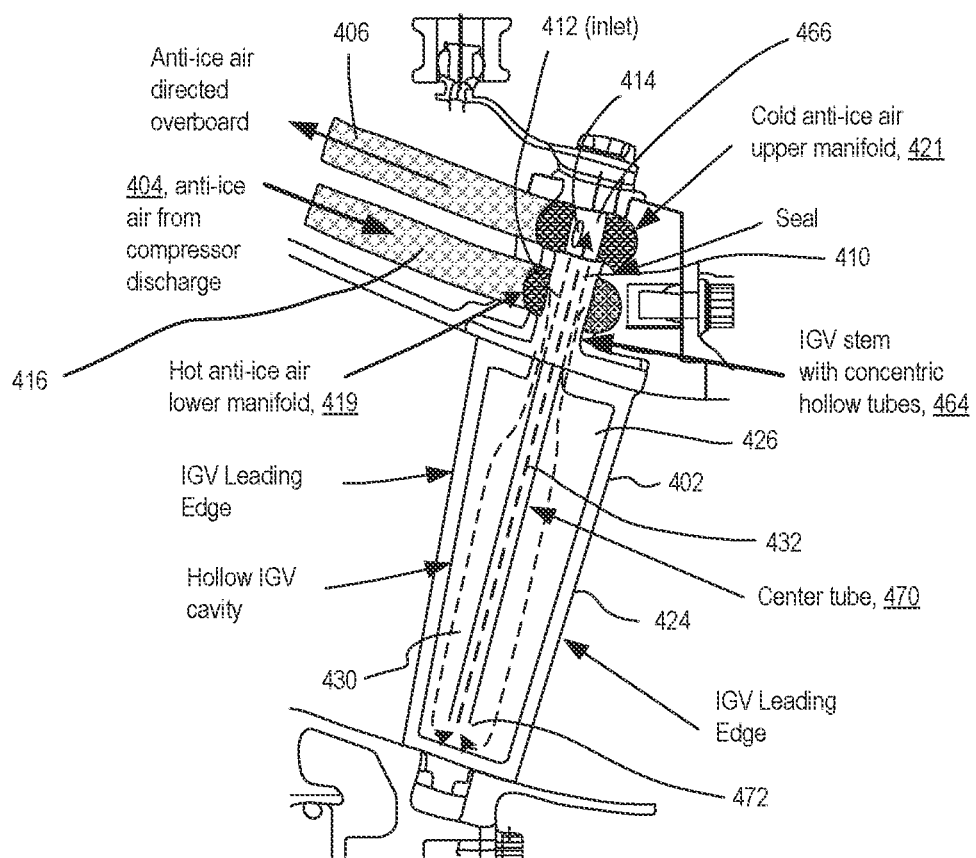
FIG. 5 is a side section view of a portion of another embodiment of an anti-ice system including a guide vane in accordance with certain aspects of the present disclosure.
Figure 6:
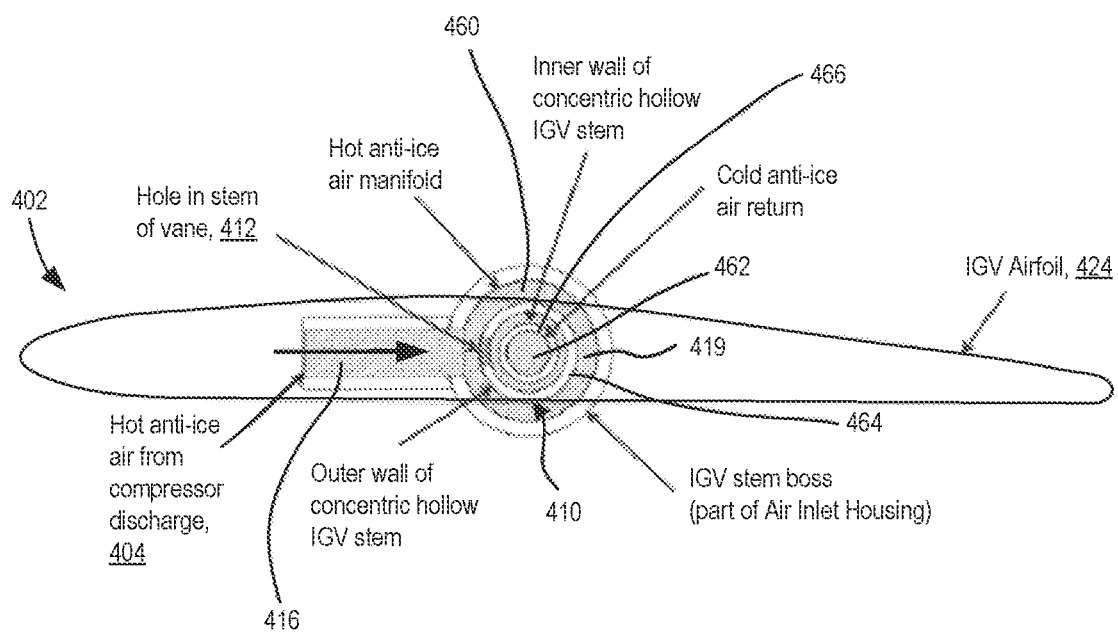
FIG. 6 is a top section view of the embodiment of an anti-ice system including a guide vane of FIG. 5.

FIGS. 5-6 show another embodiment of an anti-ice system, where up to 360 degrees of IGV rotation may be accommodated. As shown, an inlet channel 416 of the device leads to an inlet manifold 419, where the inlet manifold 419 is distinct from an outlet manifold 421. The inlet manifold 419 is associated with, and fluidly communicated with, an IGV inlet 412 located on a stem 410 of an inlet guide vane 402. The stem 410 may have multiple concentric cavities: an outer cavity 460 and an inner cavity 462. In the depicted embodiment, the outer cavity 460 is included as part of an inlet portion of the anti-ice cavity 426, and the inner cavity 462 may be included as part of an outlet portion of the anti-ice cavity 426. As such, the outer cavity 460 may be accessible via the IGV inlet 412, and the inner cavity 462 may be accessible via an IGV outlet 414.

As shown in FIG. 5, the stem 410 may have multiple segments with different diameters (where the segments are positionally-fixed to each other). For example, a first segment 464, which may generally define the outer boundary of the outer cavity 460 within the stem 410 and may be located within the inlet manifold 419, may extend directly from a main body 424 of the inlet guide vane 402. A second segment 466, which may extend from the first segment 464 radially outward within the compressor, may generally define the outer boundary of the inner cavity 462 within the stem 410 and may be located within the outlet manifold 421.

In this embodiment, since the inlet manifold 419 and the outlet manifold 421 are distinct and may completely surround their respective stem portions, the stem 410 may rotate 360 degrees about the stem's longitudinal axis without preventing airflow. Advantageously, this embodiment therefore provides enhanced IGV adjustability.

To direct airflow, an anti-ice cavity 426 within the main body 424 of the inlet guide vane 402 may generally have an inlet portion 430 (or outer portion) and an outlet portion 432 (or inner portion). This structure may be formed via including a center tube 470 within a generally hollow cavity of the main body 424, where the center tube 470 leads to the outlet inner cavity 460 of the stem 410, and where the outer portion of the anti-ice cavity 426 is directly in communication with the IGV inlet 412. Herein, a tube may be considered a "barrier" given that it separates inlet and outlet portions of an anti-ice cavity. As such, anti-ice air 404 flowing during normal operation will first flow from out-to-in through the outer portion of the anti-ice cavity until it reaches a terminus 472 of the center tube 470. The anti-ice air 404 will then flow in-to-out (or upward from the perspective of FIG. 4) through the center tube 470 to the IGV outlet 414.

Notably, the outlet channel 406 and the inlet channel 416 shown in FIG. 4 are coextensive and parallel, but this is not required. The outlet channel 406 may extend the opposite direction, as it does in the prior embodiment. As in the embodiment discussed above, the outlet channel 406 may flow towards an outlet port that ultimately dumps the anti-ice air overboard.

Figure 7:
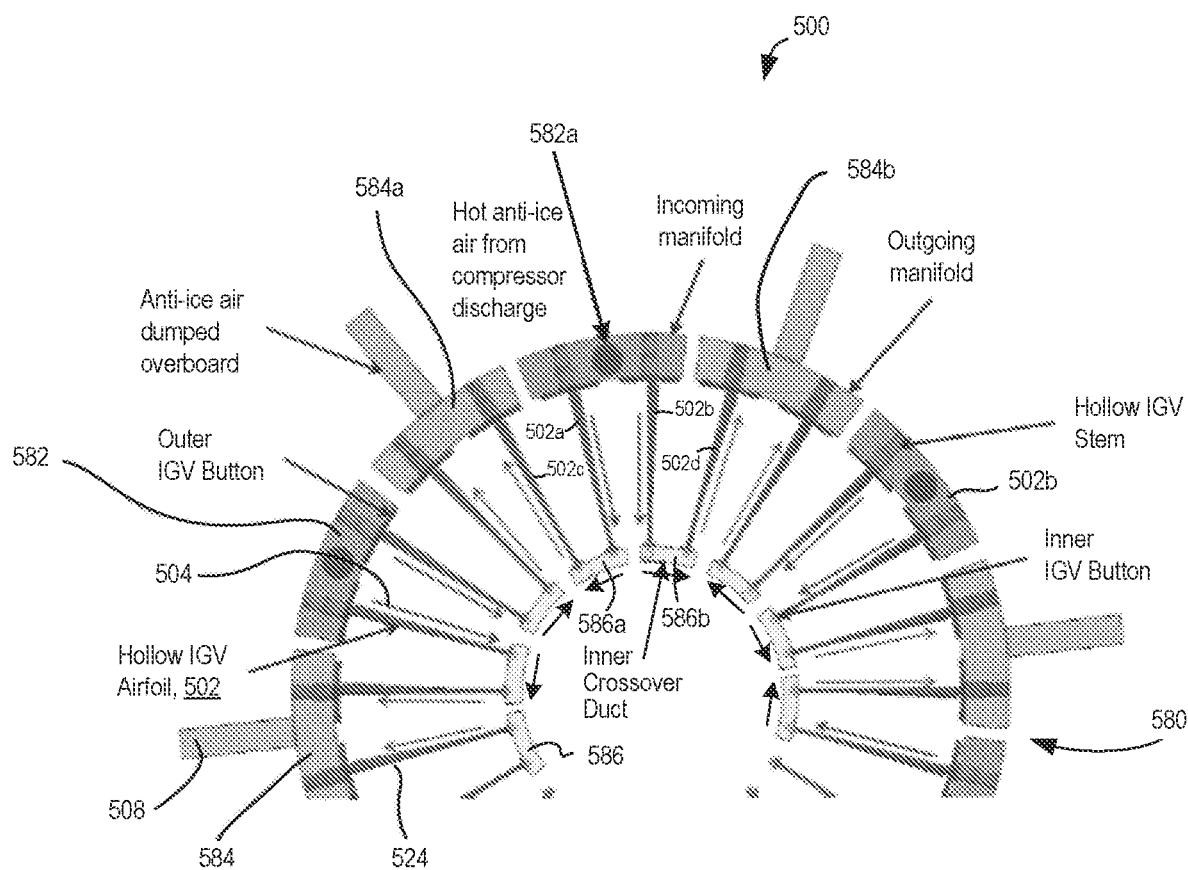
FIG. 7 is a front section view of another embodiment of an anti-ice system for a gas turbine engine, where a manifold assembly is included in accordance with certain aspects of the present disclosure.

FIG. 7 shows another embodiment of an anti-ice system. In this embodiment, anti-ice air 504 flows from a compressor discharge through tubes (much like the embodiments discussed above), and then into a 360 degree manifold arrangement 580. The manifold arrangement 580 may be integrally cast into an air inlet housing, for example, which may generally surround a plurality of inlet guide vanes 502.

The manifold arrangement 580 may be generally divided into manifolds of two types: a set of inlet manifolds 582 and a set of outlet manifolds 584. As shown, the inlet manifolds 582 may alternate with the outlet manifolds 584 along the perimeter of the manifold arrangement 580. Each of the inlet manifolds 582 may receive the anti-ice air from a location downstream within the compressor, and each of the outlet manifolds 584 may lead to an outlet port 508 for dumping the anti-ice air 504 overboard.

A unique aspect of this embodiment is the sequence of airflow of the anti-ice air 504 as it flows from an inlet manifold 582, through one or more inlet guide vanes 502, and then out via the outlet manifold 584. In particular, the anti-ice air 504 may arrive at a first inlet guide vane 502a via a first inlet manifold 582a. The first inlet manifold may also be associated with, and provide hot air to, a second inlet guide vane 502b. This is advantageous as associating each manifold with two inlet guide vanes (instead of one) may decrease the complexity of the system and the number of components needed.

The first inlet guide vane 502a (as well as the other inlet guide vanes) may include a main body 524 that is hollow, but without particular partitions (which may be distinct relative to the embodiments above). As such, air flowing through the first inlet guide vane 502a may flow radially-inwardly in a generally-linear motion to an inner crossover duct 586. The first inner crossover duct 586a may be located at the inner terminus of the first inlet guide vane 502a. Like each inlet and outlet duct, the inner crossover duct 586 may fluidly communicate with two inlet guide vanes. The first inner crossover duct 586a, for example, may be a generally hollow body that allows flow from the first inlet guide vane 502a to a third inlet guide vane 502c. Similarly, a second inner crossover duct 586b may allow flow of the anti-ice air from the second inlet guide vane 502b to a fourth inlet guide vane 502d.

Once air enters the third inlet guide vane 502c and the fourth inlet guide vane 502d, the anti-ice air flows radially outward towards, and into, respective outlet manifolds 584 (particularly the first outlet manifold 584a and the second outlet manifold 584b). Uniquely, anti-ice air entering an inlet manifold is ultimately split and flows into two different outlet manifolds, and each outlet manifold receives anti-ice air originating at two different inlet manifolds. As a result of this embodiment, two consecutive inlet guide vanes 502 with inward airflow alternate with two consecutive inlet guide vanes 502 with outward air flow around the perimeter of the system.

Figure 8:
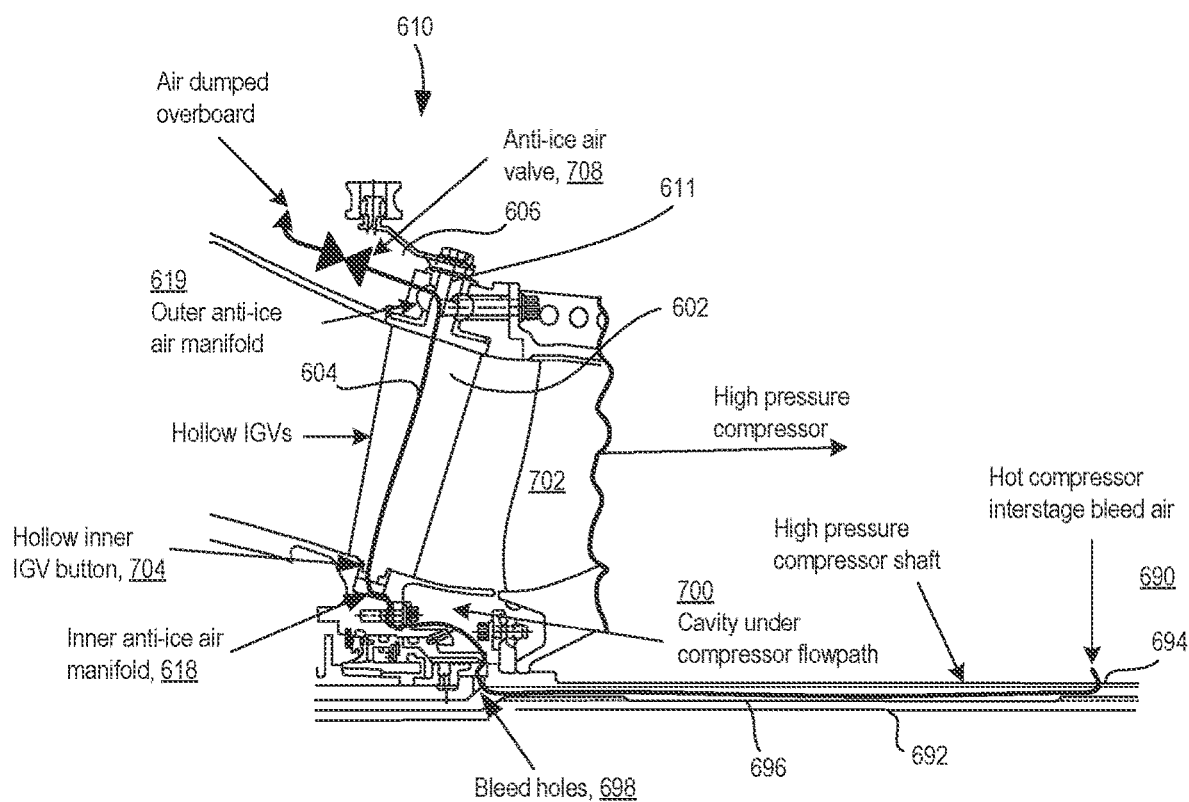
FIG. 8 is a side section view of a portion of a gas turbine engine having another embodiment of anti-ice system in accordance with certain aspects of the present disclosure.

FIG. 8 shows another embodiment of an anti-ice system 610. In this embodiment, the anti-ice air 604 is bled off from within a hub 690 of the compressor 600. The anti-ice air 604 is directed through holes or inlet openings 694 in a high pressure compressor shaft 692 and then flows through an elongated cavity 696 of the compressor shaft 692. The anti-ice air 604 then flows out through outlet openings 698 in the shaft and into a cavity 700 under (or radially inside) the compressor's main flowpath 702.

The anti-ice air 604 then enters into an inner manifold 618, which leads into each of the inlet guide vanes 602 via hollow inner stems 704 (which extend from respective main bodies 606 of the inlet guide vanes 602). The anti-ice air 604 then travels radially outward through hollow cavities of the inlet guide vanes 602, providing heating for prevention of ice, before being collected in an outer manifold 619 via an outer stem 611 of the inlet guide vane 602. Ultimately, the anti-ice air flows outward via an outlet channel 606 until being dumped overboard. A unique aspect of this embodiment is that the inlet guide vanes 602 receive airflow in an "in-to-out" flow path, which is advantageous since external piping and/or cast inlet channeling are not required to direct air at the compressor's discharge to the inlet guide vanes 602.

As shown in this embodiment, a valve 708 may regulate the flow of anti-ice air 604, turning it on and off and/or regulating the flow rate as is needed or desired. The valve in this embodiment is located in the outlet channel 606, but it may be located in other suitable locations. Further, a similar valve may be included in any other embodiment described herein, particularly either within an inlet channel or outlet channel. Other valve locations are also contemplated.

To clarify the use of and to hereby provide notice to the public, the phrases "at least one of <A>, <B>, ... and <N>" or "at least one of <A>, <B>, ... or <N>" or "at least one of <A>, <B>, <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect includes a gas turbine engine that includes: a manifold arrangement; a plurality of inlet guide vanes located radially inward of the manifold arrangement, wherein each inlet guide vane of the plurality of guide vanes includes an anti-ice cavity for directing a flow of an anti-ice air; and a plurality of crossover ducts located radially inside the manifold arrangement, wherein each crossover duct of the plurality of crossover ducts provides fluid communication between two adjacent inlet guide vanes.

A second aspect includes the first aspect, and further includes wherein the manifold arrangement includes a plurality of inlet manifolds that receive the anti-ice air from a downstream location of the gas turbine engine.

A third aspect includes the second aspect and further includes wherein the manifold arrangement includes a plurality of outlet manifolds configured to discharge the anti-ice air overboard.

A fourth aspect includes any of the first through third aspects, and further includes wherein the manifold arrangement includes a plurality of inlet manifolds and a plurality of outlet manifolds, wherein the inlet manifolds and the outlet manifolds alternate along a perimeter of the manifold arrangement.

A fifth aspect includes any of the first through fourth aspects, and further includes wherein the plurality of inlet guide vanes includes a first set of inlet guide vanes that receive inward flow and a second set of inlet guide vanes that receive outward flow of the anti-ice air.

A sixth aspect includes the fifth aspect, and further includes wherein the first set of inlet guide vanes that receive inlet flow alternate, in pairs, with the second set of inlet guide vanes that receive outward flow.

A seventh aspect includes any of the first through sixth aspects, and further includes wherein the crossover ducts are configured to direct anti-ice air from an inlet guide vane that receives inward flow to an inlet guide vane that receives outward flow.

An eighth aspect includes any of the first through seventh aspects, and further includes wherein outlet manifolds of the manifold arrangement are in fluid communication with outlet ports configured for dumping the anti-ice air overboard.

A ninth aspect includes a gas turbine engine that includes: a manifold arrangement, the manifold arrangement comprising a plurality of inlet manifolds and a plurality of outlet manifolds; and a plurality of inlet guide vanes located radially inward of the manifold arrangement, wherein each inlet guide vane of the plurality of guide vanes includes an anti-ice cavity for directing a flow of an anti-ice air, wherein the inlet manifolds and the outlet manifolds alternate along a perimeter of the manifold arrangement.

A tenth aspect includes the ninth aspect, and further includes wherein the plurality of outlet manifolds are configured to discharge the anti-ice air overboard.

An eleventh aspect includes any of the ninth or tenth aspects, and further includes wherein the plurality of inlet guide vanes includes a first set of inlet guide vanes that receive inward flow from the inlet manifolds and a second set of inlet guide vanes that receive outward flow of the anti-ice air.

A twelfth aspect includes the eleventh aspect, and further includes wherein the inlet guide vanes that receive inlet flow alternate, in pairs, with the inlet guide vanes that receive outward flow.

A thirteenth aspect includes any of the ninth through twelfth aspects, and further includes a plurality of crossover ducts that are configured to direct anti-ice air from an inlet guide vane that receives inward flow to an inlet guide vane that receives outward flow.

A fourteenth aspect includes an anti-ice system for a gas turbine engine, comprising: a compressor shaft located at the center of a core flow of the gas turbine engine; a guide vane having an anti-ice cavity; and an outlet manifold in fluid communication with the anti-ice cavity, the outlet manifold configured to discharge an anti-ice air overboard when the anti-ice air flows through the anti-ice cavity of the guide vane, wherein the compressor shaft includes an elongated cavity that directs air from a downstream location of the gas turbine engine to an inlet of the anti-ice cavity of the guide vane.

A fifteenth aspect includes the fourteenth aspect, and further includes wherein an inlet manifold is located between the elongated cavity and the anti-ice cavity, and wherein the inlet manifold is located radially inside of the core flow of the gas turbine engine.

A sixteenth aspect includes any of the fourteenth or fifteenth aspects, and further includes wherein the inlet of the anti-ice cavity is located on an inner stem, the inner stem extending from a main body of the guide vane.

A seventeenth aspect includes any of the fourteenth through sixteenth aspects, and further includes wherein an outlet of the anti-ice cavity is located on an outer stem, the outer stem extending radially outward from a main body of the guide vane, and the outlet interfacing with the outlet manifold.

An eighteenth aspect includes any of the fourteenth through seventeenth aspects, and further includes wherein the outlet manifold includes a valve for controlling a flow rate of the anti-ice air.

A nineteenth aspect includes any of the fourteenth through eighteenth aspects, and further includes wherein the downstream location is located at a discharge of the compressor.

A twentieth aspect includes a gas turbine engine including the anti-ice system of any of the fourteenth through nineteenth aspects.

We claim:
1. A gas turbine engine, comprising:
    a manifold arrangement;
    a plurality of inlet guide vanes located radially inward of the manifold arrangement, wherein each inlet guide vane of the plurality of guide vanes includes an anti-ice cavity for directing a flow of an anti-ice air; and
    a plurality of crossover ducts located radially inside the manifold arrangement, wherein each crossover duct of the plurality of crossover ducts provides fluid communication between two adjacent inlet guide vanes,
    wherein the plurality of inlet guide vanes includes a first set of inlet guide vanes that receive inward flow and a second set of inlet guide vanes that receive outward flow of the anti-ice air.
2. The gas turbine engine of claim 1, wherein the manifold arrangement includes a plurality of inlet manifolds that receive the anti-ice air from a downstream location of the gas turbine engine.
3. The gas turbine engine of claim 2, wherein the manifold arrangement includes a plurality of outlet manifolds configured to discharge the anti-ice air overboard.
4. The gas turbine engine of claim 1, wherein the manifold arrangement includes a plurality of inlet manifolds and a plurality of outlet manifolds, wherein the inlet manifolds and the outlet manifolds alternate along a perimeter of the manifold arrangement.
5. The gas turbine engine of claim 1, wherein the first set of inlet guide vanes that receive inlet flow alternate, in pairs, with the second set of inlet guide vanes that receive outward flow.
6. The gas turbine engine of claim 1, wherein the crossover ducts are configured to direct anti-ice air from an inlet guide vane that receives inward flow to an inlet guide vane that receives outward flow.

7. The gas turbine engine of claim 1, wherein outlet manifolds of the manifold arrangement are in fluid communication with outlet ports configured for dumping the anti-ice air overboard.

8. A gas turbine engine, comprising:
a manifold arrangement, the manifold arrangement comprising a plurality of inlet manifolds and a plurality of outlet manifolds; and
a plurality of inlet guide vanes located radially inward of the manifold arrangement, wherein each inlet guide vane of the plurality of guide vanes includes an anti-ice cavity for directing a flow of an anti-ice air,
wherein the inlet manifolds and the outlet manifolds alternate along a perimeter of the manifold arrangement,
wherein the plurality of inlet guide vanes includes a first set of inlet guide vanes that receive inward flow from the inlet manifolds and a second set of inlet guide vanes that receive outward flow of the anti-ice air.

9. The gas turbine engine of claim 8, wherein the plurality of outlet manifolds are configured to discharge the anti-ice air overboard.

10. The gas turbine engine of claim 8, wherein the inlet guide vanes that receive inlet flow alternate, in pairs, with the inlet guide vanes that receive outward flow.

11. The gas turbine engine of claim 8, further comprising a plurality of crossover ducts that are configured to direct anti-ice air from an inlet guide vane that receives inward flow to an inlet guide vane that receives outward flow.

12. An anti-ice system for a gas turbine engine, comprising:
a compressor shaft located at the center of a core flow of the gas turbine engine;
a guide vane having an anti-ice cavity; and
an outlet manifold in fluid communication with the anti-ice cavity, the outlet manifold configured to discharge an anti-ice air overboard when the anti-ice air flows through the anti-ice cavity of the guide vane,
wherein the compressor shaft includes an elongated cavity that directs air from a downstream location of the gas turbine engine to an inlet of the anti-ice cavity of the guide vane,
wherein an inlet manifold is located between the elongated cavity and the anti-ice cavity, and wherein the inlet manifold is located radially inside of the core flow of the gas turbine engine.

13. An anti-ice system of claim 12, wherein the inlet of the anti-ice cavity is located on an inner stem, the inner stem extending from a main body of the guide vane.

14. An anti-ice system of claim 12, wherein an outlet of the anti-ice cavity is located on an outer stem, the outer stem extending radially outward from a main body of the guide vane, and the outlet interfacing with the outlet manifold.

15. An anti-ice system of claim 12, wherein the outlet manifold includes a valve for controlling a flow rate of the anti-ice air.

16. An anti-ice system of claim 12, wherein the downstream location is located at a discharge of the compressor.

17. A gas turbine engine including the anti-ice system of claim 12.

* * * * *